April 29, 1958 R. C. DANIELS 2,832,297
ARRANGEMENT FOR WAREHOUSING MERCHANDISE
Filed Nov. 24, 1952 4 Sheets-Sheet 1
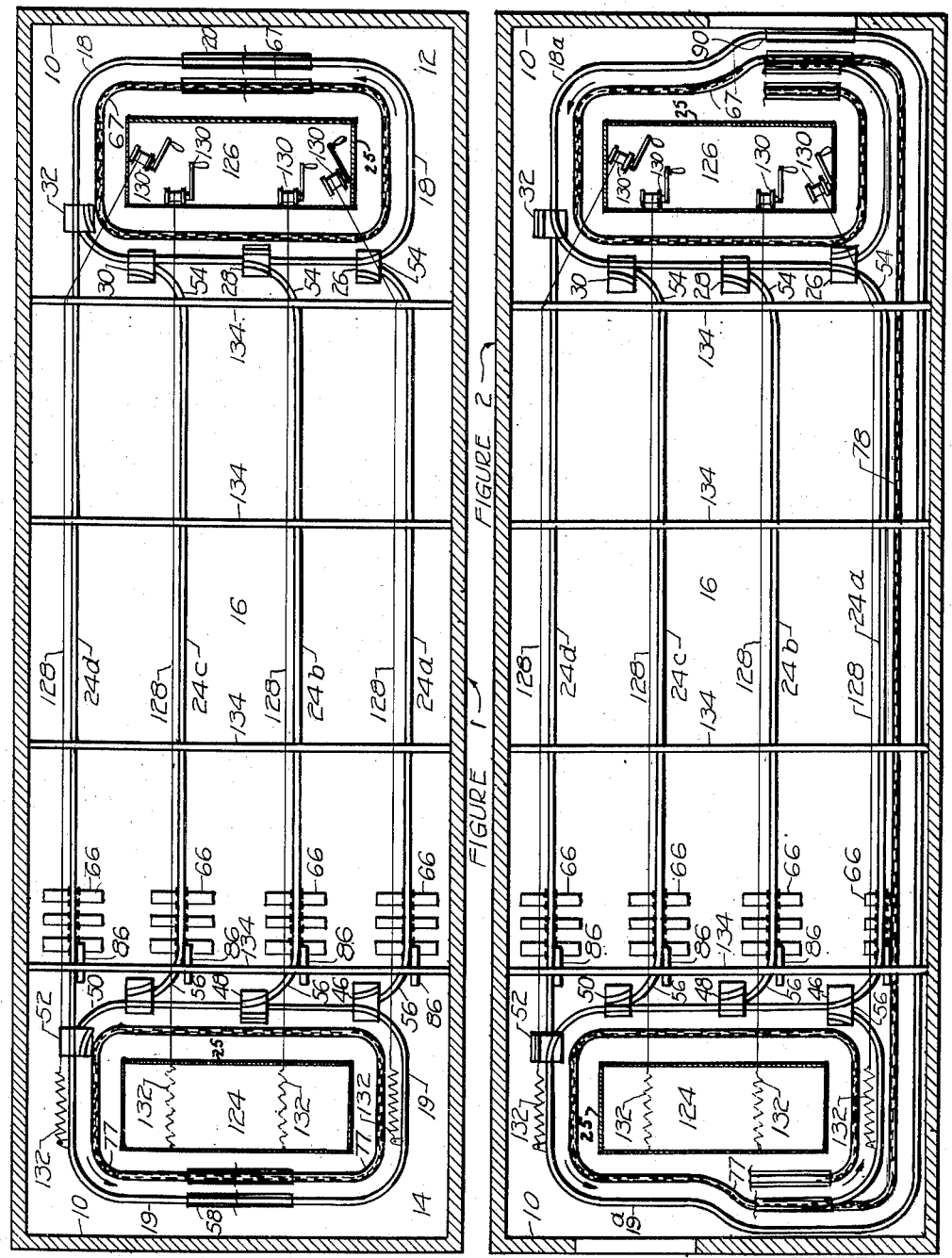
INVENTOR.
Richard C. Daniels
BY
Barnes, Kisselle, Laughlin & Raisch
ATTORNEY'S April 29, 1958  R. C. DANIELS  2,832,297
ARRANGEMENT FOR WAREHOUSING MERCHANDISE
Filed Nov. 24, 1952  4 Sheets-Sheet 2
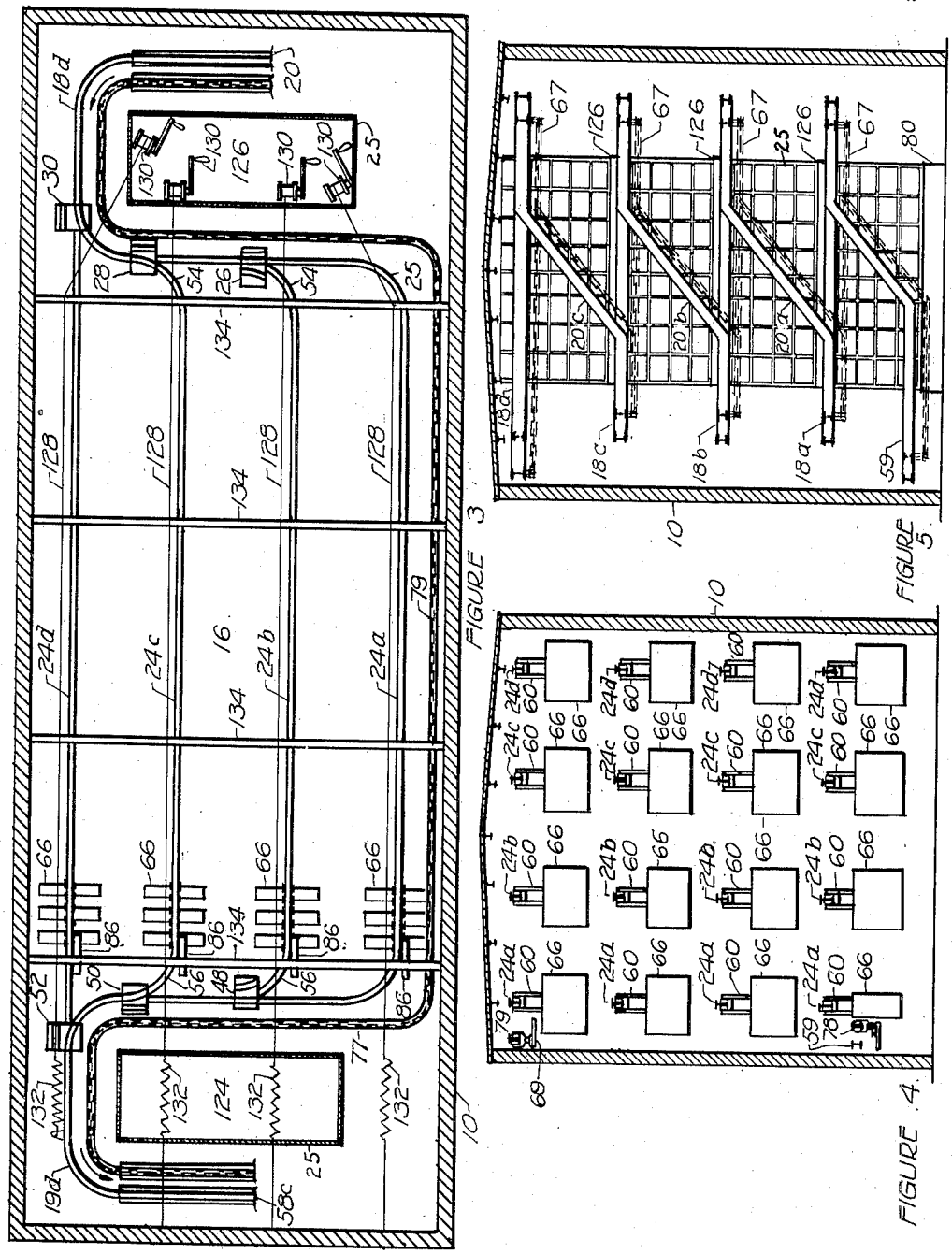
INVENTOR.
Richard C. Daniels
BY
Barnes, Kisselle, Laughlin & Raisch
ATTORNEY'S April 29, 1958
R. C. DANIELS
2,832,297
ARRANGEMENT FOR WAREHOUSING MERCHANDISE
Filed Nov. 24, 1952
4 Sheets-Sheet 3
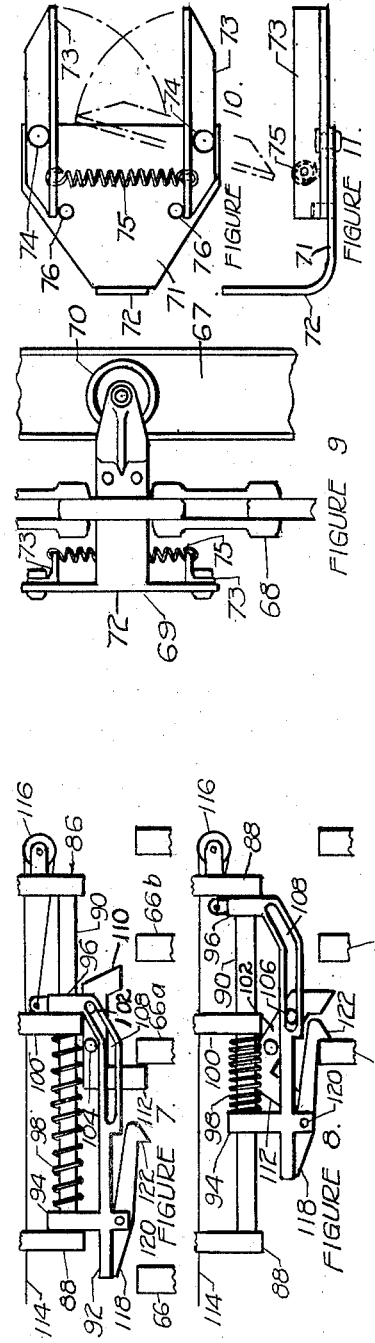
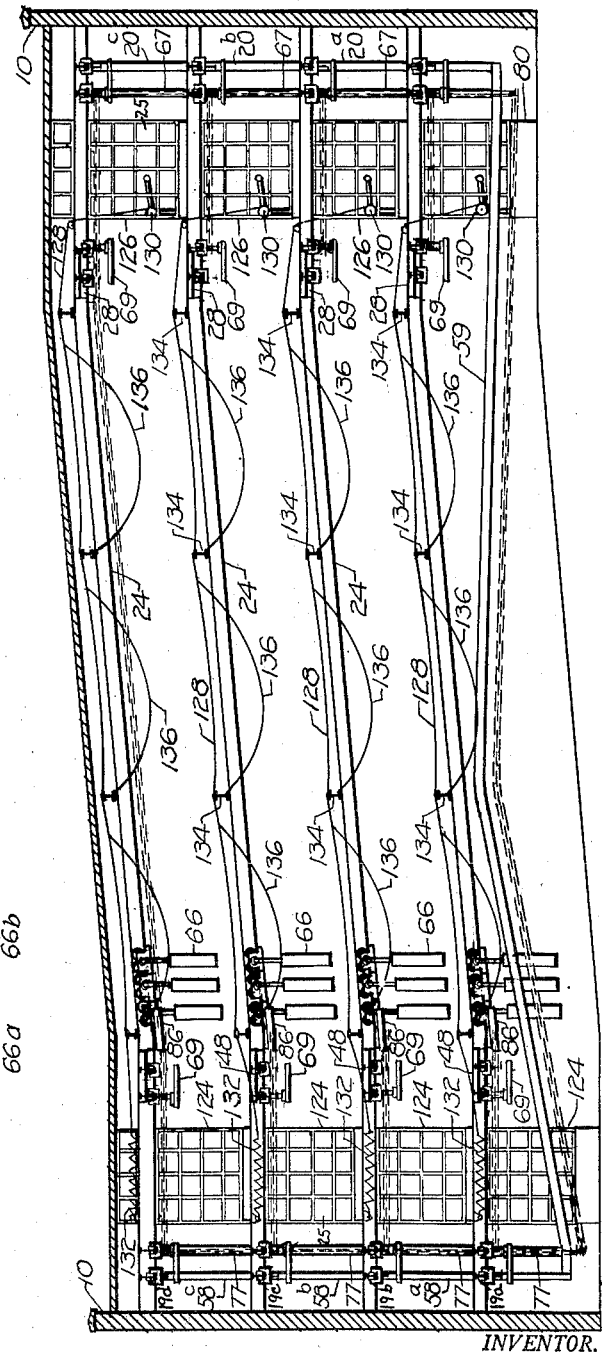
INVENTOR.
Richard C. Daniels
BY
Barnes, Kisselle, Laughlin & Raisch
ATTORNEY'S

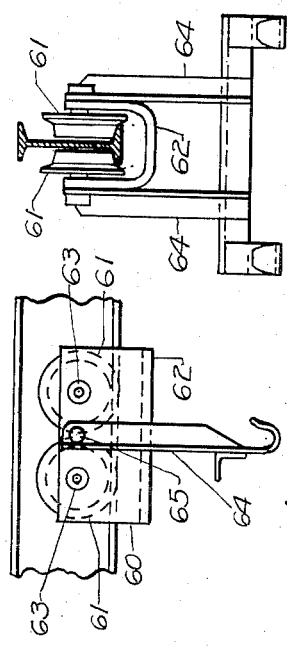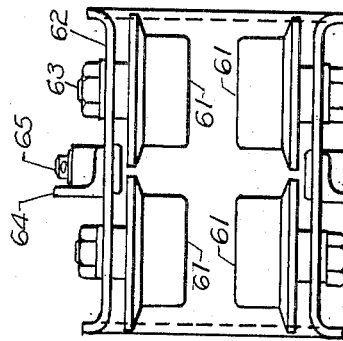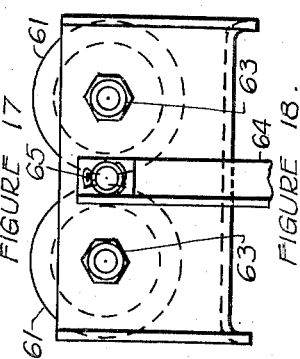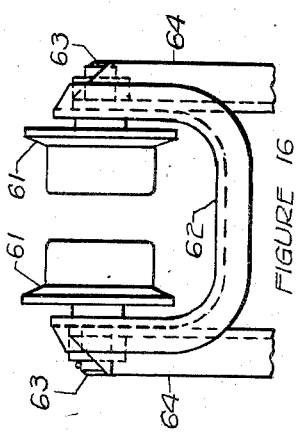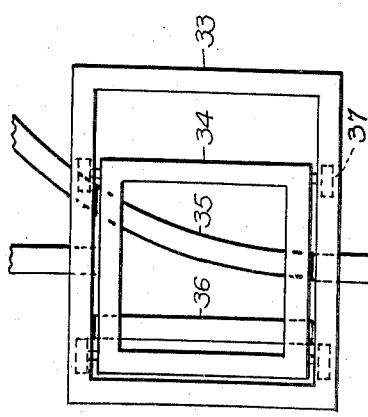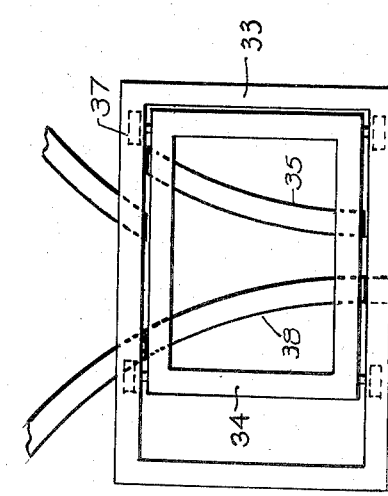

United States Patent Office 2,832,297
Patented Apr. 29, 1958

2,832,297

ARRANGEMENT FOR WAREHOUSING MERCHANDISE

Richard C. Daniels, Detroit, Mich., assignor to Garfield Engineering, Inc., Detroit, Mich., a corporation of Michigan Application November 24, 1952, Serial No. 322,289

25 Claims. (Cl. 104—91)

This invention relates to an arrangement for warehousing merchandise, and has more particularly to do with a warehouse construction which includes a receiving station at one end, a delivery or shipping station at the other end, and a storage area between the two stations.

The warehouse arrangement of this invention is particularly useful where a large inventory of many different sizes and kinds of articles must be maintained in an arrangement such that any kind or any size of article is immediately available for shipment. Within this category of merchandise fall many generally flat articles such as sheet metal parts, automobile body panels, aluminum windows, steel sash, doors, grills, screens, flat articles of furniture, and even suits of clothing.

In the arrangement of this invention the articles are suspended from overhead rails or on racks, all the articles of the same kind or same size being suspended from the same rail. At one end the storage rail connects with a receiving rail by means of which the articles in a suspended condition can be delivered to the storage area. At its opposite end the storage rail connects with a delivery rail. The receiving and delivery rails each connect with a plurality of the storage rails and means are provided for selectively connecting any of the storage rails with the receiving and delivery rails, so that articles may be selectively delivered to and from the storage rail.

In the drawings:

Fig. 1 is a diagrammatic horizontal sectional view of a warehouse embodying the invention showing an intermediate tier of monorails.

Fig. 2 is a view similar to Fig. 1 showing the lowermost tier of monorails.

Fig. 3 is a view similar to Fig. 1 showing the uppermost tier of monorails.

Fig. 4 is a diagrammatic vertical sectional view of the warehouse embodying the invention taken on a plane transversely through the storage area of the warehouse.

Fig. 5 is a view similar to Fig. 4 taken on a plane transversely through one of the end bays of the warehouse beyond the monorails.

Fig. 6 is a diagrammatic sectional view taken on a vertical plane extending longitudinally of the warehouse.

Fig. 7 is a side elevation of the bumper and feeder mechanism in its normal position.

Fig. 8 is a side elevation of the bumper and feeder mechanism in a cocked position ready to discharge one of the articles suspended from the monorails.

Fig. 9 is a side elevation of one of the pusher devices utilized for conveying the articles around the monorails Fig. 10 is a plan view of the pusher device.

Fig. 11 is a front or end view of the pusher device.

Fig. 12 is a top plan view of one of the switches employed for selectively connecting the storage rails with the monorails at either end of the warehouse.

Fig. 13 is a top plan view of another switch employed for selectively connecting the storage rails with the monorails at either end of the warehouse.

Fig. 14 is a side elevation of one of the article carriers.

Fig. 15 is an end view of the article carrier.

Fig. 16 is a fragmentary end view of the article carrier showing the details of construction on an enlarged scale.

Fig. 17 is a top plan view of the article carrier.

Fig. 18 is a fragmentary side elevation of the article carrier showing the trolley portion thereof on an enlarged scale.

The arrangement of this invention is adapted to be installed in a generally oblong warehouse, diagrammatically indicated at 10. The bay 12 at one end of the building includes the apparatus about to be described and designated the receiving station, and the bay 14 at the other end of the building contains the apparatus about to be described and referred to as the delivery station. The oblong area 16 between the bays 12 and 14 serves as the storage area.

In the bay 12 there is arranged a monorail 18 which is in the form of a spiral having a plurality of different levels, four of which are shown in Fig. 5 and designated 18a, 18b, 18c and 18d. Along the side opposite the storage area 16 the level 18a of the monorail connects with the level 18b of the monorail by means of an inclined monorail section 20a. The intermediate levels 18b and 18c of the monorail illustrated in Fig. 5 connect with their next adjacent level above by means of inclined monorail sections 20b and 20c, respectively. The upper level of the monorail 18 connects with the monorail 19 in bay 14 at the opposite end of the warehouse by means of a slightly downwardly inclined monorail section 24a. Thus, the rail 18 at the receiving station extends in a generally closed path around successive levels, each connected with the next upper adjacent level by means of an inclined track section.

Adjacent the storage area side of monorail 18 there is provided along the levels 18a, 18b and 18c a series of switching devices 26, 28, 30 and 32. The uppermost level 18d of the monorail connects directly with rail 24a as by an integral curved rail section 25, and thus at this level a switching device 26 is not necessary. Referring to Fig. 12 it will be observed that the switching devices 28, 30 and 32 each comprise a rectangular frame 33 supported on rail 18. A carriage 34, which supports an arcuate rail section 35 and a straight rail section 36, is mounted as by rollers 37 for shifting on frame 33 in a direction generally transversely of the path of rail 18 which is interrupted at each switch. The switching device 26 (Fig. 13) is generally the same as the other switching devices except that the carriage 34 supports two arcuate rail sections 35 and 38.

The switching devices 26, 28, 30 and 32 are provided for selectively connecting rail 18 with the storage monorails 24a, 24b, 24c and 24d which extend lengthwise of the warehouse from the receiving station in bay 12 to the delivery station in bay 14. The monorails 24 are arranged in rows across the width of the building and also in tiers, one above the other, for connection with the various levels of the rail 18.

In the arrangement shown in Fig. 1, for example, it will be observed that the switching devices are in a laterally shifted position such that rail 18 is connected with rail 24b at switch 28 and with rail 24d at switch 32, the switches 26 and 30 being arranged such as to form a continuous path along rail 18, the storage rails 24a and 24c being by-passed. These switches are arranged to be shifted laterally by any suitable means (not shown) such as manually, electrically, hydraulically, by gears, etc.

Rails 24, it will be observed, extend from the receiving station in bay 12 to the delivery station in bay 14 along a gradually downwardly inclined plane. At their lower ends the storage rails 24 are arranged to be selectively connected to the delivery rail 19 by means of switches 46, 48, 50 and 52. These switches are of the same general construction as the switches in the receiving station and a detailed description thereof need not be undertaken. It will suffice to say that switch 46 is provided with two arcuate rail sections 35 and 38 and each of the other switches is provided with a straight rail section 36 and a curved rail section 35 for enabling the storage rails 24 to be selectively connected with or disconnected from the delivery rail 19. At their upper ends it will be noted that rails 24a, 24b and 24c, with the exception, of course, of rail 24a of the upper tier, are connected with the receiving rail 18 by means of fixed arcuate rail sections 54 which extend from the upper ends of rails 24a, 24b and 24c in a direction generally tangentially towards the rail 18. At their lower ends rails 24a, 24b and 24c are provided with fixed arcuate rail sections 56 which extend from the rails 24a, 24b and 24c in a direction generally tangentially towards rail 19. These fixed arcuate rail sections 54 and 56 are arranged to connect with their respective rails 18 and 19 by means of the arcuate track sections on their respective switches.

The delivery rail 19 is fashioned generally similar to the receiving rail 18 at the receiving station. Rail 19 includes a plurality of different levels 19a, 19b, 19c and 19d. Level 19a of rail 19 is connected with the next adjacent level 19b by an inclined rail portion 58a, the level 19b being connected with the level 19c by means of an inclined rail section 58b and level 19c being connected with level 19d by an inclined rail section 58c. The inclined sections which connect the various levels of the delivery rail 19 are located along the side of the closed path of rail 19 opposite the storage area 16. The lowermost level of rail 19 is connected with the lowermost level of rail 18 by a longitudinally extending rail section 59. Thus, at the delivery station each level of the rail 19 is connected with the next adjacent level by an inclined portion and the lowermost level is connected with the lowermost level 18a of rail 18 so that the rails 18, 19, 24 and 59 are arranged to form a closed path between the receiving station 12 and the delivery station 14.

The rails thus far described are of the same size so as to accommodate carriers 60 which are rollably supported on the rails by means of rollers 61. The carriers 60 are fashioned as a U-shaped bracket 62 which straddles the lower edge of the rails. The rollers 61 are preferably four in number which are supported between the legs of bracket 62 as by threaded pins 63. A support arm 64 is suspended from bracket 62 as by pivot pins 65 which are located between pins 63 and preferably in the horizontal plane of pins 63. The support arms 64 are fashioned to support the articles to be warehoused, such articles as window sash, generally designated 66.

Extending along a path parallel to the receiving rail 18 there is arranged a feeder rail 67 (Fig. 2) which supports a motor driven chain 68 (see Fig. 9). A pusher member 69 is interengaged with chain 68 and is rollably supported on rail 67 as by a pair of rollers 70. Pusher member 69 comprises a base plate 71 having a leg 72 bent at right angles thereto on which the rollers 70 are mounted. A pair of arms 73 are pivoted on base plate 71 as at 74 and are urged by a spring 75 to engage stops 76 so that the arms normally assume an outwardly extending position projecting into the path of support arms 64 of carriers 60. It will be observed that when a pushing member 69 moves into engagement with a carrier suspended on the rail, one of the arms 73 will be pivoted by the carrier so that the support arm 64 becomes engaged between arms 73 and will be driven along the rail thereby. The support arm 64 is arranged to move transversely out of engagement between arms 73 as the carrier travels around one of the arcuate track sections of the switching devices previously described.

At the delivery station a rail 77 extends around a path parallel to the delivery rail 19. The lower level of rail 77 is connected with the lower level of rail 67 by means of a rail 78 extending along a path parallel to rail 59 and the upper level of rail 77 connects with the lower level of rail 67 by means of a rail 79. The arrangement is such that one or more articles 66 of the same size can be suspended from a carrier 60 along the outside run of the lower level of receiving rail 18. A loading platform 80 can be provided at the ground floor of the warehouse for facilitating loading of the articles onto the carriers 60. The chain 68 travels in the direction indicated by the arrow in Fig. 2 and it will therefore be obvious that articles suspended from the carriers 60 at the lowermost level of rail 18 will be picked up by the arms 73 and moved around the lower level and then up the inclined rail portion to the next adjacent level and so forth until the carrier is switched onto the proper storage rail 24. At the delivery station the arms 73 of the chain driven pusher members 69 serve to collect the carriers 60 and articles suspended therefrom which are switched onto the rail 19 and move them at a uniform rate around the various levels of rail 19 to the lowermost level to a discharge platform (not shown) which is suitably located such as at the outer run of the lower level of rail 19.

As the articles are delivered from rail 18 to the various rails 24 the carriers 60 on which the articles are suspended will gravitate to the lower ends of rails 24. Bumper assemblies, generally designated 86, are supported by suitable means at the lower ends of rails 24 and provide stops which are arranged to engage with the lowermost article or lowermost support arm 64 in a row to prevent the articles from being discharged onto delivery rail 19. In the arrangement shown, the bumper assemblies 86 engage with the lowermost article 66. It will be appreciated, however, that if desired the bumpers 86 may be fashioned to engage with the lowermost carrier rather than the article suspended from the lowermost carrier.

Referring now to Figs. 7 and 8, there is illustrated the general arrangement of the bumpers 86. These bumpers each include supports 88 by means of which the bumpers are suspended or otherwise suported from I-beams or other structural elements (not shown) of the building. A track or slide 90 is fixedly mounted at the lower ends of supports 88. An actuating members 92 is slidably supported on slide 90 by means of a pair of arms 94 and 96. A spring 98 arranged between arm 94 and a stop 100 fixedly supported on slide 90 normally biases actuating member 92 in a direction towards rail 19. A lever 102 pivotally supported on a fixed support (not shown) as at 104 is provided with a follower 106 which is guided within a slot 108 fashioned in actuator 92. It will be observed that the rear end of actuator 92 adjacent the arm 96 is curved upwardly so that when the actuator 92 is shifted forwardly on slide 90, follower 106 rides up the inclined portion of slot 108 to pivot lever 102 in a counter-clockwise direction. Lever 102 is provided with a pair of longitudinally spaced dogs 110 and 112. In the normal position of actuator 92, that is, in the forward position shown in Fig. 7 wherein arm 96 abuts against stop 100 by reason of the tension of spring 98, lever 102 is maintained, by reason of engagement of follower 106 with the upper end of slot 108, in a cocked position wherein the dog 112 forms a stop against which the lowermost articles 66 abuts.

For shifting actuator 92 rearwardly there is provided a cable member or lanyard 114 which extends around a pulley 116 and conects with arm 96. A hook member 118 is pivotally supported on actuator 92 as at 120. The nose portion of member 118 is provided with an inclined face 122 which, when the actuator 92 is shifted rearwardly, is arranged to engage and ride over the upper edge of the lowermost article 66a and thereby hook behind the article so that when the lanyard 114 is released and actuator 92 is shifted forwardly under the influence of spring 98, the hook 118 moves the lowermost article 66 forwardly with sufficient momentum to propel the article, together with its associated carrier, onto the delivery rail 19, the corresponding switch member between the lower end of the rail 24 and rail 19 having been previously properly actuated.

Referring to Fig. 8, it will be observed that when actuator 92 is shifted rearwardly lever 102 is cammed downwardly by follower 106 in the groove 108 thereby releasing the lowermost article 66a from engagement with the dog 112. The dog 110 is pivoted downwardly to a position wherein it forms a stop for the next adjacent article 66b. As the actuator 92 reaches the rearward limit of its movement, hook 118 rides over the upper edge of the lowermost article 66 and engages behind this lowermost article so that when the lanyard 114 is released the lowermost article 66a and its associated carrier are propelled forwardly. At the same time it will be observed that follower 106 is caused to travel upwardly along the arcuate portion of slot 108 to thereby pivot lever 102 counter-clockwise. Rear dog 110 thus releases article 66b and allows the whole row of articles to gravitate downwardly a distance corresponding to the space between successive support arms 64.

At each level of rail 19 there is provided a platform 124. Suitable stairways (not shown) are provided for connecting the successive platforms. The platforms 124 are arranged such that a man standing thereon can conveniently operate switches 46, 48, 50 and 52 and the ends of lanyards 114. The receiving station is similarly provided with a platform 126 at each level of rail 18. Platforms 126 are also arranged such that a man standing thereon can conveniently operate switches 26, 28, 30 and 32. If desired, the arrangement may be such that switches of two adjacent tiers of rails 42 can be operated from a single platform.

In order to control the speed at which the articles 66 travel downwardly along the rails 24, it is desirable to provide some form of brake means for checking the speed of these articles should they tend to travel at too rapid a rate. These means are preferably in the form of a cable 128 which extends from winches 130 on platforms 126 just above the rails 24 to counterweight or spring means 132 adjacent the platforms 124 at the opposite ends of the warehouse (Fig. 6). At spaced intervals cables 128 engage supports 134 so that when the cables 128 are slack they dip downwardly between the supports 134. At a point adjacent each of the supports 134 cables 128 have shorter cables 136 attached thereto, the opposite ends of cables 136 being anchored to the supports 134 or other suitable means. This cable arrangement is such that when a cable 128 is slackened, the weight of cables 136 causes them to assume the form of downwardly looped drags which engage the upper edges of the articles rolling down rails 42 to thereby check their speed. After the speed of the articles has been checked, the winches 130 can be operated to tighten the control cables 128 and thereby lift the drag loops 136 upwardly out of engagement with the articles.

From the above it will be seen that the warehouse arrangement described can be operated in a very efficient manner. Articles such as sash or the like, can be unloaded from railroad freight cars directly onto carriers 60 which are being fed along the lower outside run of receiving rail 18. These sash will invariably be arranged in groups of different sizes. As the sash are being loaded at the ground floor, one or two men on the platforms 126 will be in a position to direct the sash onto the proper gravity storage rail 24. As the sash travel around rail 18 along the various levels, one or more men on the platforms 126 can visibly segregate the sash into the various group sizes; and as a particular sash or group of sash approaches its corresponding monorail 24, the operator actuates the corresponding switch member such as at 26, 28, 30 or 32 so that the monorail 18 will be connected with the proper gravity storage rail 24. Normally the switches are arranged to form a continuous path around rail 18 and these switches are actuated solely when it is desired to cause the articles such as the sash being stocked to be directed onto one of the storage rails 24. As pointed out previously, any suitable means may be provided for operating the switches and the arrangement may be such that two tiers of switches may be operated from a single platform, this, for example, in an arrangement of four tiers, two men at the receiving station could spot sash or other articles onto the proper storage rail 24 with a minimum of difficulty.

The operation at the delivery station is somewhat the same. In an arrangement of four tiers, two men on the platforms 124 could actuate the lanyards 114 and operate the switches at the delivery station to maintain a constant flow of sash around delivery or collector rail 19 to the lowest level where the articles can be removed from the carriers and loaded onto trucks for shipment to the customer. For example, if it is desired to ship, say, fifteen articles stored on the monorail 24c of an intermediate tier, the operator standing on the corresponding platform 124 will observe the sash or other articles traveling around rail 19; and when there is a gap in the stream of articles which approaches switch 50, the operator can shift switch 50 so that the curved rail section 35 will connect rail 24c with the delivery rail 19. Then he will pull and release the lanyard 114 the number of times corresponding to the number of articles to be shipped. Each time the operator pulls and releases lanyard 114 one of the articles will be discharged from the rail 24c onto rail 19 as previously described. Thus, the operator can spot sash from the gravity storage rails into gaps in the stream of articles on the delivery rail 19 so that at the lowest level there will be a steady stream of articles traveling to a discharge or unloading platform.

Thus, it will be seen that I have provided a warehousing arrangement which enables storing of a maximum amount of articles of different sizes in an orderly fashion within a minimum space. The arrangement is furthermore designed to permit stocking of the warehouse in a very efficient manner with a minimum of manpower and a minimum of actual manual labor. At the same time the arrangement is such that various sizes of articles can be readily selected from the storage rails and delivered to an unloading platform for shipping. Furthermore, it will be observed that by stocking the storage rails from one end and removing articles from the other end for shipment, there will be a constant replenishment of new articles in the inventory. On any particular storage rail the oldest articles will be at the delivery end of the rail and the most recently stocked articles will be at the receiving end of the row of articles.

It will also be observed that the general arrangement described herein lends itself admirably to a warehouse involving a minimum of cost with respect to the building itself. The building as shown in Fig. 6 may be built on a gradual incline with the roof sloped accordingly. The only portions of the building in which human activity occurs to any extent is at the platforms 124 and 126. Thus, these platforms may be fully enclosed in walled structures or closed towers 25 into which the operating means for the switches, bumper stops and drag lines extend. Thus, only the towers 25 need be heated and illuminated. The remainder of the building need not be provided with floors or heating, lighting, ventilating and plumbing facilities. Thus, the savings effected through this economical building construction offset the cost of the monorail structure and its associated components.

What I claim is:

1. In a warehousing structure, a plurality of elongated storage areas extending side by side, a storage rail extending longitudinally in each of said storage areas at an angle inclined to the horizontal, a receiving station at the end of said storage areas corresponding to the higher ends of said rails, a delivery station at the opposite ends of said storage areas, a feed rail at said receiving station traversing the higher ends of said storage rails, a delivery rail at said delivery station traversing the lower ends of said storage rails, switch means for selectively connecting the higher end of each storage rail with said feed rail and the lower end of each storage rail with said delivery rail, carrier members freely movable on said rails and adapted to support articles to be stored and carry said articles along said rails, means forming a releasable bumper at the lower end of each of said storage rails behind which a row of carrier members supporting articles are arranged to be accumulated on said storage rails, flexible cable means extending longitudinally in each of said storage areas in a plane above the articles supported on said storage rails by said carrier members, and means for providing slack in said cable means to enable lowering the cable means into engagement with the upper edges of the articles traveling downwardly along said storage rail and thereby check the speed of said articles.

2. The combination set forth in claim 1 wherein the said means for providing slack in said cable means are positioned at said receiving station.

3. In a warehousing structure, a plurality of elongated storage areas extending side by side, a storage rail extending longitudinally in each of said storage areas at an angle inclined to the horizontal, a receiving station at the end of said storage areas corresponding to the higher ends of said rails, a delivery station at the opposite ends of said storage areas, a feed rail at said receiving station traversing the higher ends of said storage rails, a delivery rail at said delivery station traversing the lower ends of said storage rails, switch means for selectively connecting the higher end of each storage rail with said feed rail and the lower end of each storage rail with said delivery rail, carrier members freely movable on said rails and adapted to support articles to be stored and carry said articles along said rails, means forming a releasable bumper at the lower end of each of said storage rails behind which a row of carrier members supporting articles are arranged to be accumulated on said storage rails, flexible cable means extending longitudinally in each of said storage areas in a plane above the articles supported on said storage rails by said carrier members, drag members suspended from said flexible cable means, and means for providing slack in said cable means to enable lowering of said drag members into engagement with the upper edges of the articles traveling downwardly along said storage rail and thereby check the speed of said articles.

4. In a warehousing structure, a plurality of elongated storage areas arranged vertically in tiers and horizontally into a plurality of adjacent rows, a storage rail extending longitudinally in each of said storage areas at an angle inclined to the horizontal, a receiving station at the end of said storage areas corresponding to the higher ends of said rails, a delivery station at the opposite ends of said storage areas, a feed rail at said receiving station extending generally as a vertical spiral path and having a plurality of horizontally extending portions traversing the higher ends of the rows of storage rails in each tier, a delivery rail at said delivery station extending generally as a vertical spiral path and having a plurality of horizontally extending portions traversing the lower ends of the rows of rails in each tier, means for selectively connecting the higher end of each rail with the adjacent horizontally extending portion of the feed rail and the lower end of each storage rail with the adjacent horizontally extending portion of the delivery rail, a plurality of carrier members freely movable on said rails and adapted to support articles to be stored and carried along said rails and a releasable bumper member at the lower end of each storage rail behind which a plurality of carrier members supporting articles are arranged to be accumulated as a row.

5. In a warehousing structure, a plurality of elongated storage areas arranged vertically in tiers and horizontally into a plurality of adjacent rows, a storage rail extending longitudinally in each of said storage areas at an angle inclined to the horizontal, a receiving station at the end of said storage areas corresponding to the higher ends of said rails, a delivery station at the opposite ends of said storage areas, a feed rail at said receiving station extending generally as a vertical spiral path and having a plurality of horizontally extending portions traversing the higher ends of the rows of storage rails in each tier, a delivery rail at said delivery station extending generally as a vertical spiral path and having a plurality of horizontally extending portions traversing the lower ends of the rows of rails in each tier, switch means for selectively connecting the higher end of each rail with the adjacent horizontally extending portion of the feed rail and the lower end of each storage rail with the adjacent horizontally extending portion of the delivery rail, a plurality of carrier members freely movable on said rails and adapted to support articles to be stored and carried along said rails, means forming a stop at the lower end of each storage rail behind which a row of carrier members supporting articles are arranged to be accumulated, and means for selectively actuating said stop for releasing one or more carrier members from the lower end of said storage rails through said switch means and onto said delivery rail.

6. In a warehousing structure, a plurality of elongated storage areas arranged vertically in tiers and horizontally into a plurality of adjacent rows, a storage rail extending longitudinally in each of said storage areas at an angle inclined to the horizontal, a receiving station at the end of said storage areas corresponding to the higher ends of said rails, a delivery station at the opposite end of said storage areas, a feed rail at said receiving station extending generally as a vertical spiral path and having a plurality of horizontally extending portions traversing the higher ends of the rows of storage rails in each tier, a delivery rail at said delivery station extending generally as a vertical spiral path and having a plurality of horizontally extending portions traversing the lower ends of the rows of rails in each tier, means for selectively connecting the higher end of each rail with the adjacent horizontally extending portion of the feed rail and the lower end of each storage rail with the adjacent horizontally extending portion of the delivery rail, a plurality of carrier members freely movable on said rails and adapted to support articles to be stored and carried along said rails, and power means for pushing said carrier members around said spiral rails.

7. The combination set forth in claim 6 wherein said last mentioned means comprises power driven chain means extending along a path adjacent and generally parallel to said spiral rails, and pusher means carried by said chain means and extending into the path of travel of carrier members on said spiral rails so as to engage and propel said carrier members along said spiral rails.

8. The combination set forth in claim 6 including a longitudinally extending rail connecting the upper run of said spiral feed rail with the upper run of said spiral delivery rail and a second longitudinally extending rail connecting the lower spiral run of said delivery rail with the lower spiral run of said feed rail.

9. The combination set forth in claim 6 including a longitudinally extending rail connecting the upper run of said spiral feed rail with the upper run of said spiral delivery rail and a second longitudinally extending rail connecting the lower spiral run of said delivery rail with the lower spiral run of said feed rail, said spiral feed rails and delivery rails and said two longitudinally extending rails forming a substantially continuous path for said carrier members.

10. The combination set forth in claim 9 wherein said power means for pushing said carrier members around said spiral rails comprises power driven chain means extending along a path adjacent and generally parallel to said feed rail, said delivery rail and said two longitudinally extending rails, and pusher means carried by said chain means and extending into the path of travel of said carrier members so as to engage and propel said carrier members along said rails.

11. In a warehousing structure, a plurality of elongated storage areas arranged vertically in tiers and horizontally into a plurality of adjacent rows, a storage rail extending longitudinally in each of said storage areas at an angle inclined to the horizontal, a receiving station at the end of said storage areas corresponding to the higher ends of said rails, a delivery station at the opposite ends of said storage areas, a feed rail at said receiving station extending generally as a vertical spiral path and having a plurality of horizontally extending portions traversing the higher ends of the rows of storage rails in each tier, a delivery rail at said delivery station extending generally as a vertical spiral path and having a plurality of horizontally extending portions traversing the lower ends of the rows of rails in each tier, means for selectively connecting the higher end of each rail with the adjacent horizontally extending portion of the feed rail and the lower end of each storage rail with the adjacent horizontally extending portion of the delivery rail, a plurality of carrier members freely movable on said rails and adapted to support articles to be stored and carried along said rails, a releasable bumper member at the lower end of each storage rail behind which a plurality of carrier members supporting articles are arranged to be accumulated as a row, and a plurality of vertically spaced horizontally extending platforms at said receiving and delivery stations adjacent the horizontal portions of said feed and delivery rails.

12. The combination set forth in claim 11 wherein said means for selectively connecting the higher ends of said storage rails with said feed rail and the lower ends of said storage rails with the delivery rail are positioned such as to be actuatable by a person standing on said platforms.

13. In a warehousing structure, a plurality of elongated storage areas arranged vertically in tiers and horizontally into a plurality of adjacent rows, a storage rail extending longitudinally in each of said storage areas at an angle inclined to the horizontal, a receiving station at the end of said storage areas corresponding to the higher ends of said rails, a delivery station at the opposite ends of said storage areas, a feed rail at said receiving station extending generally as a vertical spiral path and having a plurality of horizontally extending portions traversing the higher ends of the rows of storage rails in each tier, a delivery rail at said delivery station extending generally as a vertical spiral path and having a plurality of horizontally extending portions traversing the lower ends of the rows of rails in each tier, switch means for selectively connecting the higher end of each rail with the adjacent horizontally extending portion of the feed rail and the lower end of each storage rail with the adjacent horizontally extending portion of the delivery rail, a plurality of carrier members freely movable on said rails and adapted to support articles to be stored and carried along said rails, means forming a stop at the lower end of each storage rail behind which a row of carrier members supporting articles are arranged to be accumulated, means for selectively actuating said stop for releasing one or more carrier members from the lower end of said storage rails and directing them through said switch means and onto said delivery rail, a plurality of vertically spaced horizontally extending platforms at said delivery station adjacent said horizontal portions of said delivery rail, said switch means for connecting the lower ends of said storage rails with said delivery rail and said actuating means for said stop members being positioned such as to be operable by a person standing on the platform adjacent said stop means and switch means.

14. In a warehouse structure, a longitudinally extending storage space, a rail member extending longitudinally in said storage space at an angle inclined to the horizontal, a feed rail adjacent the higher end of said storage rail, a delivery rail adjacent the lower end of said storage rail, a plurality of carrier members freely movable on said rails and adapted to support articles to be stored and carried along said rails, the inclination of said storage rails being such that said carrier members will travel from the higher to the lower ends of said storage rails by reason of gravity, support means in said storage area, cable means on said support means extending longitudinally in said storage areas in a plane above the articles supported on said storage rails, means for providing varying degrees of slack in said cable means and drag means suspended from said cable means for frictionally engaging the upper edges of the articles moving downwardly along said storage rails when said cable means are slack.

15. The combination set forth in claim 14 wherein said drag means comprise a plurality of shorter cable means fixedly anchored at one end and attached to said first mentioned cable means at their opposite ends.

16. In a warehousing structure of the type including a longitudinally extending storage area, a storage rail extending longitudinally in said storage area at an angle inclined to the horizontal, a delivery rail connected with the lower end of said storage rail and a plurality of carrier members freely movable on said rails and adapted to carry articles, means at the lower end of said storage rail forming a stop behind which a plurality of carrier members supporting articles are adapted to be accumulated as a row, said means comprising a support adjacent said lower end of said rail, a lever having a fixed pivotal connection with said support on an axis extending generally transversely of the adjacent portion of said storage rail, said lever being pivoted intermediate its ends on said support and having a dog at each end thereof, said dogs being spaced apart such as to accommodate one of said articles therebetween in a fashion such that when the lever is pivoted in one direction one dog is shifted from a position in the path of travel of the articles to a position out of the path of travel of the articles and the other dog is shifted from a position out of the path of travel of the articles to a position in the path of travel of the articles, and means slidably mounted on said support for pivoting said lever in said opposite directions.

17. A bumper and release mechanism for use with an inclined conveyor rail on which a plurality of carrier members supporting articles are free to gravitate to the lower end of the rail comprising a support positioned adjacent said lower end of the rail, a lever pivoted intermediate its ends on said support on an axis generally perpendicular to the path of travel of the carrier members, said lever having a dog at its front end and a dog at its rear end, an actuating member reciprocably movable and slidably on said support, means forming an operative connection between said actuating means and said lever such that the lever is pivoted in opposite directions in response to movement of said actuating member in opposite directions, said lever being arranged such that when pivoted in one direction the front dog is disposed in the path of travel of said articles and when pivoted in the opposite direction the rear dog is disposed in the path of travel of said articles, said dogs being spaced apart a distance generally corresponding to the spacing of said articles on said rail so that the dogs are adapted to accommodate one of said articles therebetween whereby when said lever is pivoted in a direction such that the forward dog is moved from a position in the path of travel of the articles into a position out of the path of travel of the articles, the article disposed between said dogs is released by said front dog and the rear dog provides a stop for the next adjacent article and when the lever is pivoted in the opposite direction the rear dog moves out of the path of travel of said last mentioned article and said last mentioned article moves forwardly into engagement with the front dog.

18. The combination set forth in claim 17 wherein said actuating means includes a hook member adapted to engage the foremost article when the actuating member is moved in one direction to pivot the front dog out of the path of travel of said articles and propel said foremost article forwardly on said rail when the actuator member is moved in the opposite direction to pivot the front dog into the path of travel of said articles.

19. The combination set forth in claim 18 wherein said actuating member is reciprocably mounted on said support for movement in a direction generally parallel to the path of travel of said articles adjacent said support.

20. The combination set forth in claim 18 including means normally biasing said actuating member to a position wherein the front dog is disposed in the path of travel of said articles.

21. The combination set forth in claim 18 wherein said hook is pivotally supported on said actuating member.

22. The combination set forth in claim 18 wherein said actuating member is reciprocably mounted on said support for movement in a direction generally parallel to the path of travel of said articles adjacent said support and spring means acting between said support and said actuating member urging said actuating member in a forward direction whereby when said actuating member is shifted rearwardly to a position wherein said hook member engages the foremost article on said rail and is released said spring means shifts said actuating member in a direction which propels said articles forwardly on said conveyor rail.

23. A warehousing structure comprising a floorless building having side walls and a roof, the interior of said building being divided into a plurality of elongated storage areas extending side by side longitudinally within the building, a storage rail extending longitudinally in each of said storage areas, a feed rail at one end of said building traversing the adjacent ends of said storage rails, a delivery rail at the opposite end of said building traversing the other ends of said storage rails, switch means for selectively connecting each storage rail with the feed rail at one end and the delivery rail at the other end, the arrangement being such that articles movably suspended from said rails are adapted to be conveyed from said feed rail to said storage rails and from said storage rails to said delivery rail, an enclosed structure adjacent said feed rail, an enclosed structure adjacent said delivery rail, and actuating means extending from said switch means into said enclosed structures whereby said switch means can be operated from within said enclosed structures.

24. The combination set forth in claim 23 including means at the ends of said storage rails adjacent said delivery rail for discharging articles stored on said storage rails onto said delivery rail and means for actuating said last mentioned means, said actuating means extending into the enclosed structure adjacent said delivery rail.

25. The combination set forth in claim 24 including support means in said building, means on said support means for controlling the speed with which the articles travel along said storage rails from said feed rail toward said delivery rail and actuating means for said speed controlling means extending into the enclosed structure adjacent said feed rail.

References Cited in the file of this patent

UNITED STATES PATENTS

| | | |
|---|---|---|
| 564,949 | Sumner | July 28, 1896 |
| 683,370 | Acklin | Sept. 24, 1901 |
| 845,926 | Breck | Mar. 5, 1907 |
| 919,352 | Hinderland | Apr. 27, 1909 |
| 994,124 | Colahan | June 6, 1911 |
| 1,496,444 | Braley | June 3, 1924 |
| 1,570,934 | Bennington | Jan. 28, 1926 |
| 1,867,410 | Juergens | July 12, 1932 |
| 1,917,836 | Haddlesay | July 11, 1933 |
| 1,994,032 | Angerpointer | Mar. 12, 1935 |
| 2,078,503 | Meiser | Apr. 27, 1937 |
| 2,470,060 | Webb et al. | May 10, 1949 |
| 2,485,215 | Rose | Oct. 18, 1949 |
| 2,593,699 | Rose | Apr. 22, 1952 |
| 2,621,609 | McCaul et al. | Dec. 16, 1952 |

FOREIGN PATENTS

| | | |
|---|---|---|
| 532,231 | Great Britain | Jan. 20, 1941 |